United States Patent
Han (10) Patent No.: US 10,133,442 B2
(45) Date of Patent: Nov. 20, 2018

(54) METHOD AND APPARATUS FOR ACCESSING A CHAT ROOM

(71) Applicant: TENCENT TECHNOLOGY (SHENZHEN) COMPANY LIMITED, Shenzhen (CN)

(72) Inventor: Bing Han, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 597 days.

(21) Appl. No.: 14/451,128

(22) Filed: Aug. 4, 2014

(65) Prior Publication Data

US 2014/0365924 A1    Dec. 11, 2014

Related U.S. Application Data

(63) Continuation of application No. PCT/CN2014/077863, filed on May 20, 2014.

(30) Foreign Application Priority Data

Jun. 8, 2013   (CN) .......................... 2013 1 0228368

(51) Int. Cl.
    *G06F 17/00*     (2006.01)
    *G06F 3/00*      (2006.01)
    (Continued)

(52) U.S. Cl.
    CPC ...... *G06F 3/04817* (2013.01); *G06F 3/04842* (2013.01)

(58) Field of Classification Search
    CPC ............ G06F 3/04817; G06F 3/04842; H04L 41/5093; H04L 12/1813; H04L 29/12094; H04L 61/1529
    (Continued)

(56) References Cited

U.S. PATENT DOCUMENTS 5,864,605 A * 1/1999 Keshav ................. H04M 3/493
                                                    379/67.1
5,941,947 A * 8/1999 Brown ................ G06F 21/6218
                                                    709/225
(Continued)

FOREIGN PATENT DOCUMENTS

CN       1979419 A      6/2007
CN     101079718 A     11/2007
(Continued)

OTHER PUBLICATIONS

The World Intellectual Property Organization (WIPO) International Search Report for PCT/CN2014/077863 dated Aug. 20, 2014.

(Continued)

*Primary Examiner* — Esther B Henderson
*Assistant Examiner* — Golam Mahmud
(74) *Attorney, Agent, or Firm* — Anova Law Group, PLLC (57) ABSTRACT

Methods and apparatus for accessing a chat room are provided. A shortcut of the chat room to be accessed can be detected. When that a user clicks on the shortcut of the chat room to be accessed is detected, a room identification of the chat room to be accessed and protocol name information of a protocol used by a voice client can be obtained from the shortcut of the chat room to be accessed. The chat room to be accessed can then be accessed according to the room identification of the chat room to be accessed and the protocol name information.

13 Claims, 5 Drawing Sheets

(51) Int. Cl.
*H04L 12/66* (2006.01)
*G06F 3/0481* (2013.01)
*G06F 3/0484* (2013.01)

(58) Field of Classification Search
USPC .......................................................... 709/206
See application file for complete search history.

(56) References Cited

U.S. PATENT DOCUMENTS

| | | | | |
|---|---|---|---|---|
| 6,757,365 | B1* | 6/2004 | Bogard | H04L 51/04 379/88.17 |
| 6,788,667 | B1* | 9/2004 | Beresin | H04M 3/4938 370/338 |
| 8,688,092 | B1* | 4/2014 | Bladon | G10L 15/26 379/71 |
| 8,732,251 | B2* | 5/2014 | Reynolds | G06Q 10/10 709/206 |
| 8,769,428 | B2* | 7/2014 | Mir | G06F 3/0484 715/779 |
| 8,863,183 | B2* | 10/2014 | Kutaragi | H04N 21/2743 382/118 |
| 8,959,330 | B2* | 2/2015 | Dobronsky | G06F 17/30899 709/206 |
| 9,307,010 | B2* | 4/2016 | Bae | H04L 67/06 |
| 9,641,568 | B2* | 5/2017 | Deng | H04L 67/1095 |
| 2005/0094621 | A1* | 5/2005 | Acharya | H04L 29/06027 370/352 |
| 2005/0259638 | A1* | 11/2005 | Burg | H04L 12/1813 370/352 |
| 2006/0053194 | A1* | 3/2006 | Schneider | H04L 12/1827 709/204 |
| 2007/0208992 | A1* | 9/2007 | Koren | G06Q 10/10 715/212 |
| 2007/0283295 | A1* | 12/2007 | Honma | H04N 1/00244 715/847 |
| 2008/0045234 | A1* | 2/2008 | Reed | H04W 8/02 455/456.1 |
| 2008/0129469 | A1* | 6/2008 | Sumner | G06Q 10/107 340/313 |
| 2010/0205541 | A1* | 8/2010 | Rapaport | G06Q 10/10 715/753 |
| 2010/0205544 | A1* | 8/2010 | Brzeski | H04L 12/66 715/758 |
| 2014/0137018 | A1* | 5/2014 | Eichberger | G06F 17/21 715/769 |
| 2014/0245162 | A1* | 8/2014 | Deibler | H04L 12/1822 715/737 |

FOREIGN PATENT DOCUMENTS

| | | |
|---|---|---|
| CN | 101192144 A | 6/2008 |
| CN | 101754103 A | 6/2010 |
| CN | 101784020 A | 7/2010 |
| CN | 102946343 A | 2/2013 |
| CN | 102946404 A | 2/2013 |
| CN | 103023913 A | 4/2013 |
| CN | 103312594 A | 9/2013 |

OTHER PUBLICATIONS

The State Intellectual Property Office of the People's Republic of China (SIPO) Office Action 1 for 201310228368.9 dated Aug. 4, 2015.

The State Intellectual Property Office of the People's Republic of China (SIPO) Office Action 1 for 201310228368.9 dated Dec. 3, 2015.

\* cited by examiner

METHOD AND APPARATUS FOR ACCESSING A CHAT ROOM

CROSS-REFERENCES TO RELATED APPLICATIONS

This application is a continuation application of PCT Patent Application No. PCT/CN2014/077863, filed on May 20, 2014, which claims priority to Chinese Patent Application No. CN201310228368.9, filed on Jun. 8, 2013, the entire content of which is incorporated herein by reference.

FIELD OF THE DISCLOSURE

The present disclosure relates to the field of Internet communication and, more particularly, relates to methods and apparatus for accessing a chat room.

BACKGROUND

With development of Internet technology, Internet-based desktop client software product has been widely used. For example, voice client is currently widely used as desktop client. Users can chat by accessing a chat room via a voice client.

A conventional method for accessing the chat room includes that a user uses a voice client to log in a voice server. After the user logs into the voice server, the voice client opens a voice interface and displays, on the voice interface, information including name of the chat rooms contained on the voice server. Users can find the name of the chat room that he/she wants to access from the voice interface and submit to the voice client. The voice client then accesses the chat room that the user wants to access.

However, when a user accesses a number of chat rooms displayed on the voice interface of the chat room that the user often accesses, it usually takes a long time for the user to find the chat room that the user often accesses from a number of chat rooms displayed on the voice interface. This may result in low efficiency for accessing the chat room.

BRIEF SUMMARY OF THE DISCLOSURE

One aspect of the present disclosure includes a method for accessing a chat room. A shortcut of the chat room to be accessed can be detected. When that a user clicks on the shortcut of the chat room to be accessed is detected, a room identification of the chat room to be accessed and protocol name information of a protocol used by a voice client can be obtained from the shortcut of the chat room to be accessed. The chat room to be accessed can then be accessed according to the room identification of the chat room to be accessed and the protocol name information.

Another aspect of the present disclosure includes an apparatus for accessing a chat room. The apparatus can include a detecting module, an obtaining module, and an accessing module. The detecting module can be configured to detect a shortcut of the chat room to be accessed. The obtaining module can be configured, when that a user clicks on the shortcut of the chat room to be accessed is detected, to obtain, from the shortcut of the chat room to be accessed, a room identification of the chat room to be accessed and protocol name information of a protocol used by a voice client. The accessing module can be configured to access the chat room to be accessed according to the room identification of the chat room to be accessed and the protocol name information.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

FIG. 2-1 is a flow chart of another exemplary method of accessing a chat room in accordance with various disclosed embodiments;

FIG. 2-2 is a schematic illustrating an exemplary first voice interface in accordance with various disclosed embodiments;

FIG. 2-3 is a schematic illustrating an exemplary second voice interface in accordance with various disclosed embodiments;

FIG. 2-4 is a schematic illustrating an exemplary terminal desktop in accordance with various disclosed embodiments;

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Figure 1:
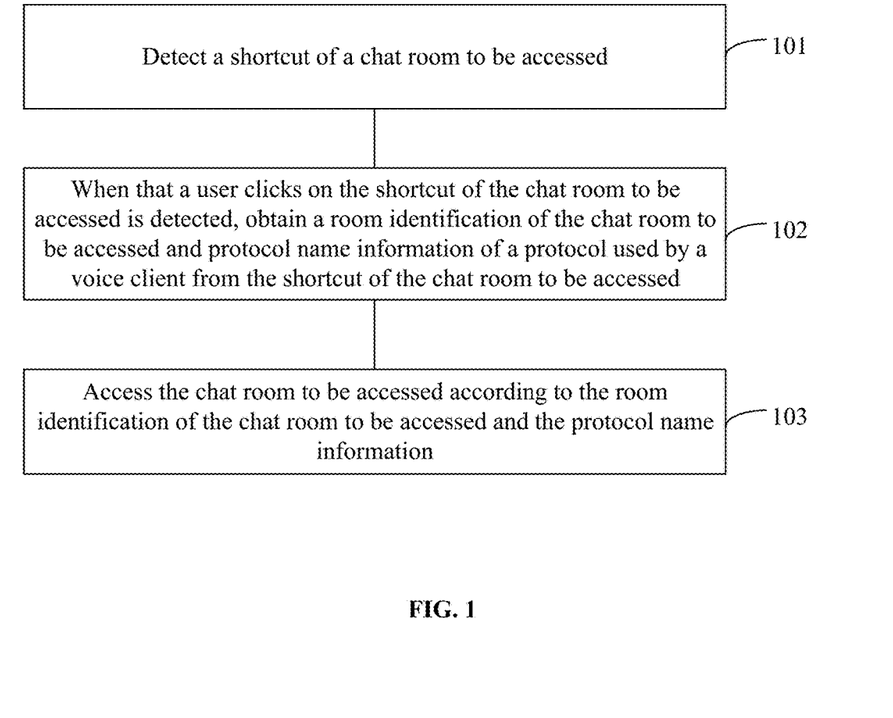
FIG. 1 is a flow chart of an exemplary method of accessing a chat room in accordance with various disclosed embodiments.
Figure 3:
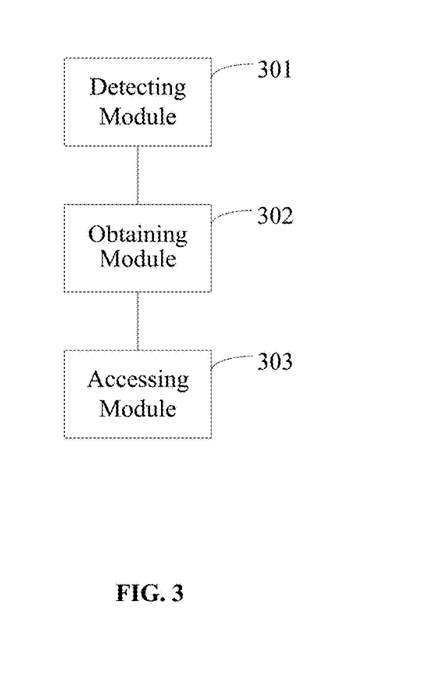
FIG. 3 is a structure schematic of an exemplary apparatus of accessing a chat room in accordance with various disclosed embodiments.

FIGS. 1-3 depict exemplary methods and apparatus for accessing a chat room in accordance with various disclosed embodiments. The exemplary methods and apparatus can be implemented in an exemplary environment as shown in FIG. 4 and by appropriate computing platform as shown in FIG. 5.

Figure 4:
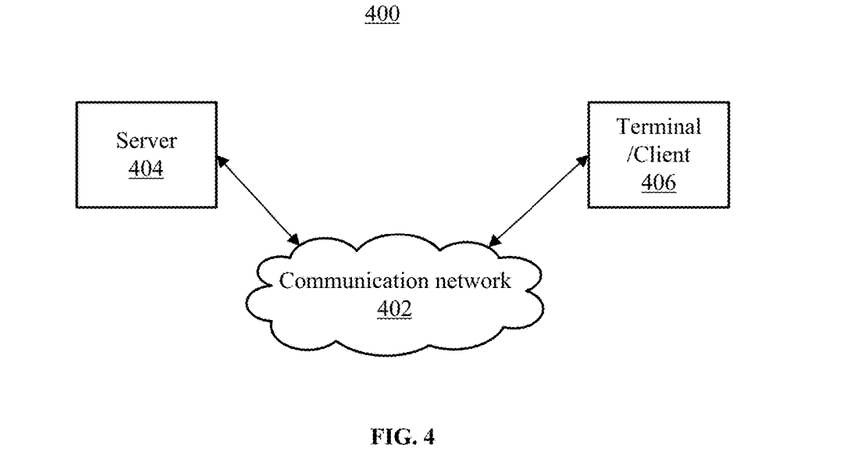
FIG. 4 depicts an exemplary environment incorporating certain disclosed embodiments.
Figure 5:
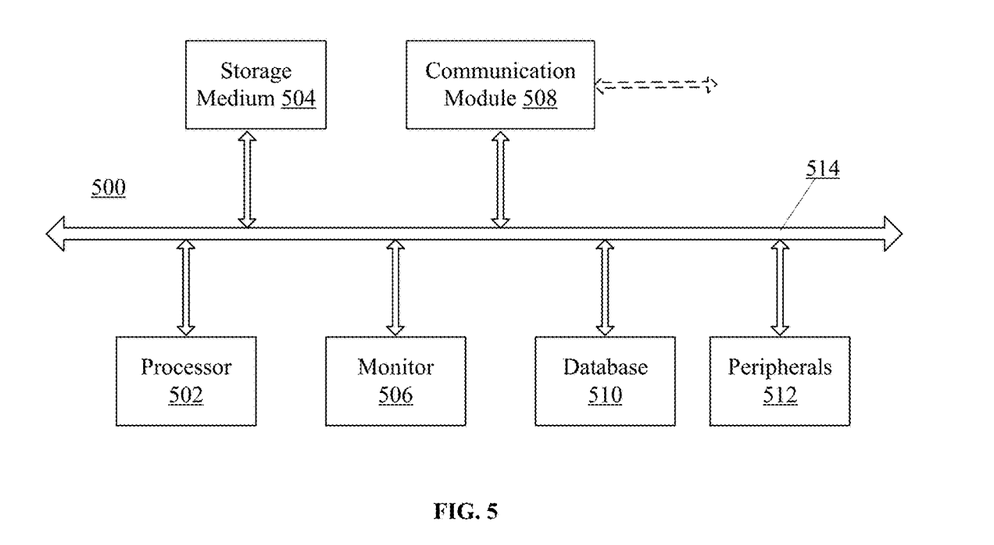
FIG. 5 depicts an exemplary server consistent with the disclosed embodiments.

FIG. 4 depicts an exemplary environment 400 incorporating exemplary information obtaining methods and apparatus in accordance with various disclosed embodiments. As shown in FIG. 4, the environment 400 can include a server 404, a terminal/client 406 (hereinafter referred as "terminal 406"), and a communication network 402. The server 404 and the terminal 406 may be coupled through the communication network 402 for information exchange, such as data processing, database searching, etc. Although only one terminal 406 and one server 404 are shown in the environment 400, any number of terminals 406 or servers 404 may be included, and other devices may also be included.

The communication network 402 may include any appropriate type of communication network for providing network connections to the server 404 and terminal 406 or among multiple servers 404 or terminals 406. For example, the communication network 402 may include the Internet or other types of computer networks or telecommunication networks, either wired or wireless.

A terminal, as used herein, may refer to any appropriate user terminal device with certain computing capabilities including, e.g., a personal computer (PC), a work station computer, a hand-held computing device (e.g., a tablet), a mobile terminal (e.g., a mobile phone or a smart phone), or any other user-side computing device. A terminal may be installed with various clients such as voice clients. A server, as used herein, may refer to one or more server computers configured to provide certain server functionalities, such as database management. A server may also include one or more processors to execute computer programs in parallel. An exemplary server may include a voice server, a client server, etc.

The server 404 and the terminal 406 may be implemented on any appropriate computer platform. FIG. 5 shows a block diagram of an exemplary computing system 500 capable of implementing the server 404 and/or the terminal 406. As shown in FIG. 5, the exemplary computer system 500 may include a processor 502, a storage medium 504, a monitor 506, a communication module 508, a database 510, peripherals 512, and one or more bus 514 to couple the devices together. Certain devices may be omitted and other devices may be included.

The processor 502 can include any appropriate processor or processors. Further, the processor 502 can include multiple cores for multi-thread or parallel processing. The storage medium 504 may include memory modules, such as ROM (Read-Only Memory), RAM (Random Access Memory) and flash memory modules, and mass storages, such as CD-ROM, U-disk, removable hard disk, etc. The storage medium 504 may store computer programs for implementing various processes (such as image processing, image transformation, etc.), when executed by the processor 502.

The monitor 506 may include display devices for displaying information outputted by the computing system 500. Further, the peripherals 512 may include I/O devices such as keyboard and mouse. The communication module 508 may include network devices for establishing connections through the communication network 402. The database 510 may include one or more databases for storing certain data and for performing certain operations on the stored data. In some embodiments, the database 510 can be within the terminal 406. In other embodiments, the database 510 can be within the server 404 and connected with the terminal 406 through the communication network 402, and the terminal 406 can obtain information outputted by the operations (such as database operations) on the server 404.

In operation, the terminal 406 may cause the server 404 to perform certain actions, such as database search or other database operations. The server 404 may be configured to provide structures and functions for such actions and operations.

In various embodiments, a terminal such as a mobile terminal involved in the disclosed methods and systems can include the terminal 406, while a server involved in the disclosed methods and systems can include the server 404. In some embodiments, the disclosed methods and apparatus can be executed by a mobile terminal. The disclosed apparatus can include the computer system as shown in FIG. 5. In some cases, the disclosed apparatus can be configured within or related to a mobile terminal.

FIG. 1 depicts an exemplary method of accessing a chat room in accordance with various disclosed embodiments.

In Step 101, a shortcut of a chat room to be accessed is detected.

In Step 102, when that a user clicks on the shortcut of the chat room to be accessed is detected, a room identification of the chat room to be accessed and protocol name information of a protocol used by a voice client are obtained from the shortcut of the chat room to be accessed.

In Step 103, the chat room to be accessed is accessed according to the room identification of the chat room to be accessed and the protocol name information.

As disclosed, a shortcut of the chat room to be accessed can be detected. When that a user clicks on the shortcut of the chat room to be accessed is detected, a room identification of the chat room to be accessed and protocol name information of a protocol used by a voice client can be obtained from the shortcut of the chat room to be accessed. The chat room to be accessed can then be accessed according to the room identification of the chat room to be accessed and the protocol name information. Because the shortcut can be used for directly accessing the chat room, the user does not need to look for the chat room to be accessed from a number of chat rooms. Efficiency for accessing the chat room can then be improved.

Figure 21:
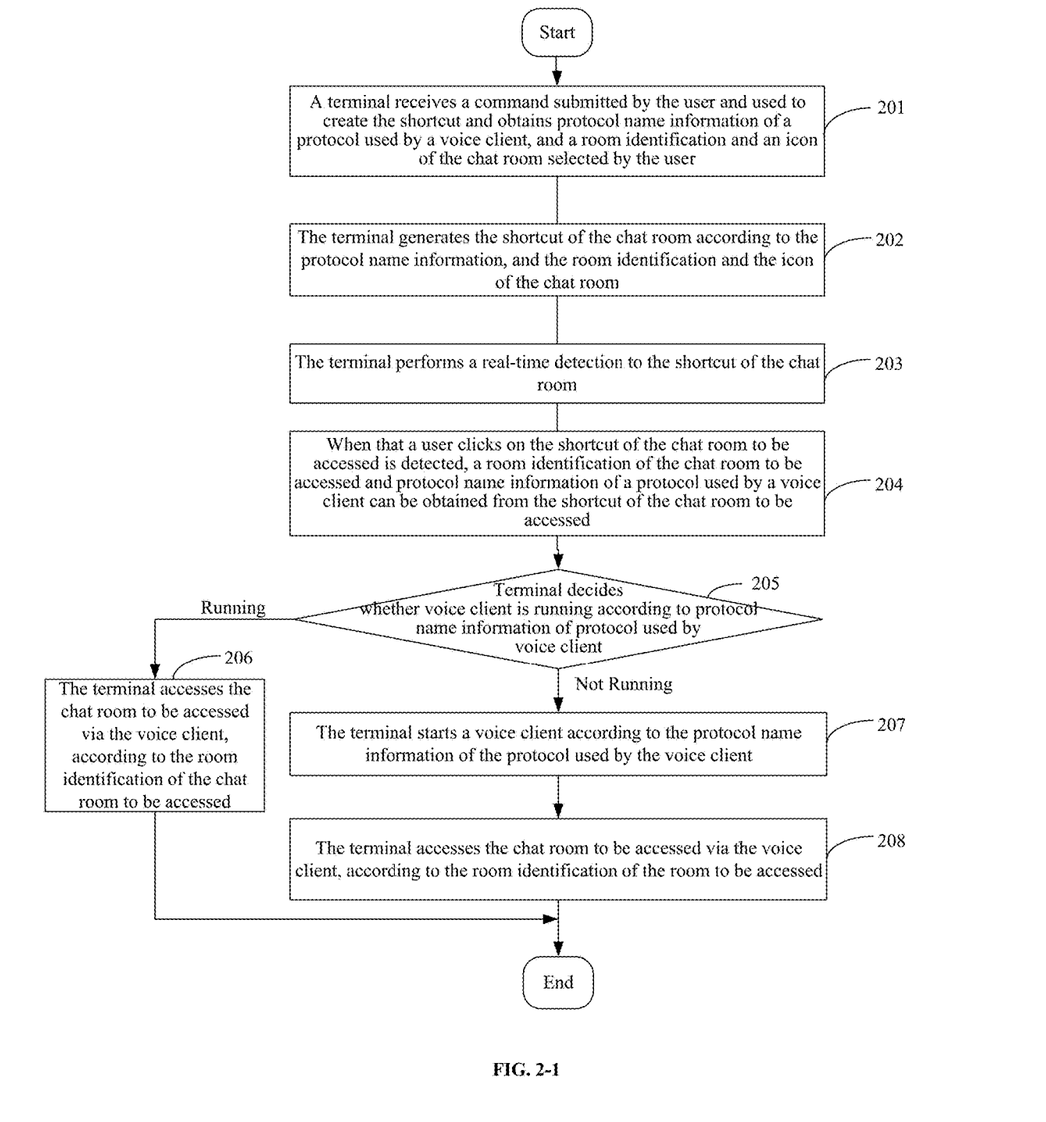

FIG. 2-1 depicts another exemplary method of accessing the chat room, according to the exemplary embodiment as depicted in FIG. 1.

In Step 201, a terminal receives a command submitted by the user and used to create the shortcut and obtains protocol name information of a protocol used by a voice client, and a room identification and an icon of the chat room selected by the user.

For example, the voice client can be pre-installed in the terminal and the user can start the voice client installed in the terminal to log in the voice server via the voice client. When the user logs into the voice server, the voice server can send self-contained room-related information of the chat room on the voice server to the voice client. The room-related information can contain room identification, room name, and/or icon of the chat room. The voice client can receive the room information of the chat room sent from the voice server, open a voice interface, and display the received room-related information of the chat room on the voice interface.

The user can find room-related information of a chat room that needs to create a shortcut from room-related information of chat rooms displayed on a voice client, and submit a command used for creating the shortcut to the voice client or a terminal.

When the voice client is developed, a protocol used for communication between the voice client and the voice server can be defined. When the voice client is installed on a terminal, the terminal can locally store protocol name information of the protocol used by the voice client.

For example, the terminal can receive the command submitted by the user and used to create the shortcut; locally obtain the protocol name information of the protocol used by the voice client; and obtain the room identification and the icon of the chat room selected by the user from room-related information of the chat rooms selected by the user.

In addition, the terminal can further obtain a user account and/or a user password. For example, when the user logs into the voice server, the voice server can obtain room-related information of each of a chat room 1, a chat room 2, a chat room 3, a chat room 4, and a chat rooms self-contained on the voice server.

The room-related information of the chat room 1 can contain an icon, room identification ID1 and the room name Name1 of the chat room 1. The room-related information of the chat room 2 can contain an icon, room identification ID2 and the room name Name2 of the chat room 2. The room-related information of the chat room 3 can contain an icon, room identification ID3 and the room name Name3 of the chat room 3. The room-related information of the chat room 4 can contain an icon, room identification ID4 and the room name Name4 of the chat room 4. The room-related information of the chat room 5 can contain an icon, room identification ID5 and the room name Name5 of the chat room 5. Then, the voice server can send the room-related information of each of a chat room 1, a chat room 2, a chat room 3, a chat room 4, and a chat rooms to the voice client.

Figure 22:
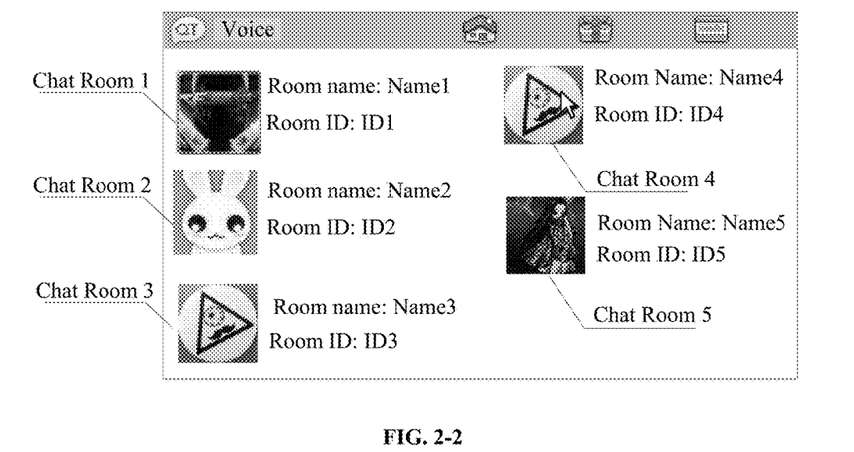

When the voice client receives the room-related information of the chat room 1, the room-related information of the chat room 2, the room-related information of the chat room 3, the room-related information of the chat room 4, the room-related information of the chat room 5, the voice client can open an voice interface as shown in FIG. 2-2, and display the room-related information of the chat room 1, the room-related information of the chat room 2, the room-related information of the chat room 3, the room-related information of the chat room 4, and the room-related information of the chat room 5 on the voice interface shown in FIG. 2-2.

Figure 23:
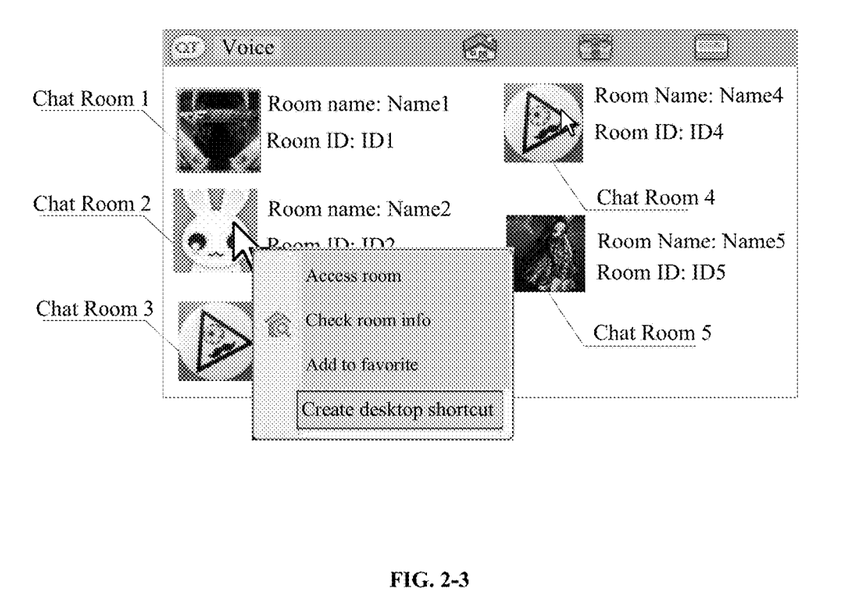

Referring to FIG. 2-3, the user can select the room-related information of the chat room 2, open the right-button menu of the chat room 2, and submit to the terminal the command used for creating the shortcut by clicking on a menu item of "creating a desktop shortcut" contained in the right-button menu.

In Step 202, the shortcut of the chat room is generated according to the protocol name information, and the room identification and the icon of the chat room.

For example, the terminal can create a file having a file type of a shortcut type, set the icon of the chat room as an icon of the file, store the protocol name information and the room identification of the chat room in the file, and obtain the shortcut of the chat room. In addition, the terminal can further store the obtained user account and user password in the file contained by the shortcut of the chat room.

In one embodiment, after creating the shortcut of the chat room, the terminal can further display the shortcut of the chat room on the terminal desktop.

Optionally, the user can further select other chat rooms, and generate a shortcut of the selected chat rooms according to Step 201 and Step 202. As a result, one or more shortcuts of the chat rooms can be displayed on the terminal desktop.

Figure 24:
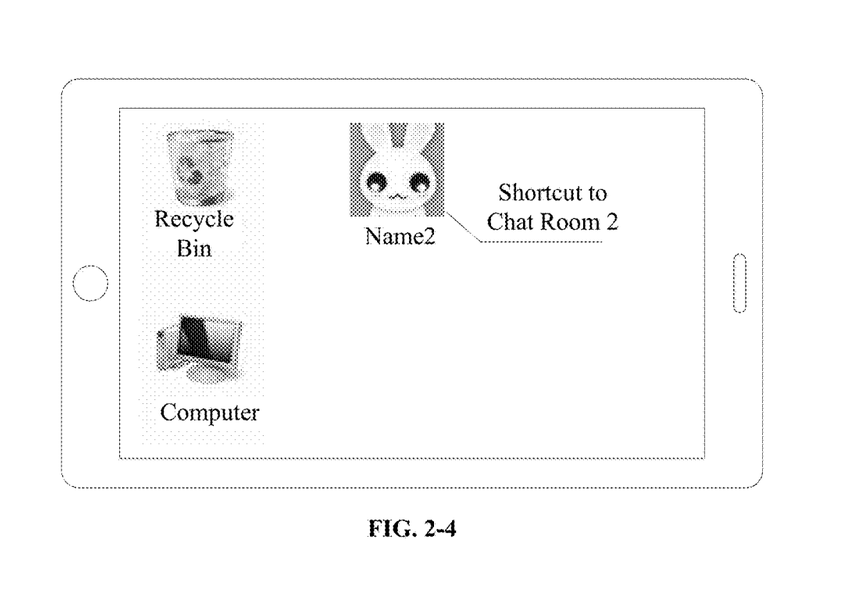

For example, the terminal can submit a command used for creating a shortcut; obtain protocol name information of the protocol used by the voice client as "qt:", room identification of the chat room 2 as ID2, and an icon; create a file having a file type of a shortcut type; and store the obtained protocol name information "qt:" and the room identification ID2 of the chat room 2 in the file to obtain the shortcut of the chat room 2. As shown in FIG. 2-4, the shortcut of the chat room 2 can be displayed on the terminal desktop by the terminal.

In Step 203, the terminal performs a real-time detection to the shortcut of the chat room.

In one embodiment, the terminal can perform a real-time detection to one or more shortcuts of the chat rooms displayed on the terminal desktop. After the terminal displays one or more shortcuts of the chat rooms on the terminal desktop, the user can select one chat room as the chat room to be accessed, and click on the shortcut of the chat room to be accessed via a mouse or touch screen or any other inputting/outputting devices.

In Step 204, when that a user clicks on the shortcut of the chat room to be accessed is detected, a room identification of the chat room to be accessed and protocol name information of a protocol used by a voice client can be obtained from the shortcut of the chat room to be accessed.

For example, the terminal can perform a real-time monitor and/or detection to the shortcut of the chat room 2. The user can select the chat room 2 as the chat room to be accessed, and click on the shortcut of the chat room 2 via the mouse or touch screen or other inputting/outputting devices. When that the user clicks on the shortcut of the chat room 2 via the mouse or touch screen or other inputting/outputting devices is detected, the terminal can obtain, from the shortcut of the chat room 2, the room identification ID2 of the chat room 2 and protocol name information "qt:" of a protocol used by the voice client.

In Step 205, the terminal decides whether the voice client is running according to the protocol name information of the protocol used by the voice client. When the voice client is determined running, Step 206 can be performed. When the voice client is determined not running, Step 207 can be performed.

For example, according to the protocol name information, the terminal can obtain process identification (PID) information of a process used for running the voice client from the correspondence relationship between the protocol name information and the PID information contained in the terminal registry.

Whether the process used for running the voice client is running can be decided according to the obtained PID information. When the process used for running the voice client is running, it can be determined that the voice client is running. When the process used for running the voice client is not running, it can be determined that the voice client is not running.

For example, when the voice client is developed, the process used for running the voice client and the PID information of the process can be defined. When the voice client is installed on the terminal, the terminal can obtain the protocol name information of the protocol used by the voice client and the PID information of the process used for running the voice client, and store the obtained protocol name information and the PID information in the correspondence relationship between the protocol name information and the PID information contained in the terminal registry.

When the voice client is started, the terminal can obtain the PID information of the process used for running the voice client, then create a process, set the obtained PID information as the PID information of the process, and use the process for running the voice client. When the voice client quits running, the terminal can end the process used for running the voice client. So when the process used for running the voice client is running, the voice client is decided to be running. When the process used for running the voice client is not running, the voice client is decided not to be running.

TABLE 1

| Protocol Name Information | PID Information |
|---|---|
| qt: | Process ID1 |
| . . . | . . . |

For example, when the voice client is installed on the terminal, the terminal can obtain the protocol name information "qt:" of the protocol used by the voice client and the PID information "Process ID1" of the process used for running the voice client, and store the obtained the protocol name information "qt:" and the PID information "Process ID1" to the correspondence relationship between the protocol name information and the PID information contained in the terminal registry as shown in Table 1.

By obtaining the protocol name information "qt:" of the chat room 2, the terminal can obtain the PID information "Process ID1" of the process used for running the voice client from the correspondence relationship between the protocol name information and the PID information contained in the terminal registry as shown in Table 1. According to the PID information "Process ID1", the terminal can determine whether the process used for running the voice client is running. When the process used for running the voice client is determined to be running, the voice client is decided to be running.

In Step 206, the terminal accesses the chat room to be accessed via the voice client, according to the room identification of the chat room to be accessed. This may conclude the operation.

For example, the terminal can submit the room identification of the chat room to be accessed to the voice client. The voice client can receive the room identification of the chat room to be accessed and send a request message used for accessing the chat room to the voice server. The request message can contain the room identification of the chat room to be accessed and the user account. The voice server can receive the request message, obtain the chat room to be accessed according to the room identification of the chat room to be accessed contained by the request message, add the user account contained in the request message to the chat room to be accessed, and send each of user accounts contained in the chat room to be accessed and the room-related information to the voice client. The voice client can receive each of the user accounts contained in the chat room to be accessed and the room-related information, create a room-displaying interface, and display all of the user accounts contained in the chat room to be accessed and the room-related information on the room-displaying interface. In this manner, the chat room to be accessed can be accessed.

For example, the terminal submits the room identification ID2 of the chat room 2 to the voice client. The voice client receives the room identification ID2 of the chat room 2, sends the request message used for accessing the chat room to the voice server, the request message containing the room identification ID2 of the chat room 2 and the user account. The voice server receives the request message, obtains the chat room 2 according to the room identification ID2 of the chat room 2 contained in the request message, adds all of the user account contained by the request message to the chat room 2, and sends all of the user accounts contained in the chat room 2 and the room-related information to the voice client. The voice client receives all of the user accounts contained in the chat room to be accessed and the room-related information, creates the room-displaying interface, displays all of the user accounts contained in the chat room 2 and the room-related information on the room-displaying interface to access the chat room 2.

In Step 207, a voice client is started according to the protocol name information of the protocol used by the voice client.

For example, the terminal obtains the storage path of the voice client from the correspondence relationship between the protocol name information and the storage path contained in the terminal registry, according to the protocol name information of the protocol used by the voice client; and starts the voice client according to the storage path of the voice client.

When the voice client is locally installed in the terminal, the terminal obtains the storage path locally stored by the voice client, and stores the protocol name information of the protocol used by the voice client and the obtained storage path to the correspondence relationship between the protocol name information and the storage path contained in the terminal registry.

The operation of the terminal starting the voice client according to the storage path of the voice client can include: the terminal locally finds the voice client, according to the storage path of the voice client, and starts the voice client. The voice client logs into the voice server according to the user account and the user password, which are self-stored on the voice client.

For example, when the voice client is locally installed, the terminal obtains the storage path "Router1" stored in the local by the voice client, and stores the protocol name information "qt:" of the protocol used by the voice client and the obtained storage path "Router1" in the correspondence relationship between the protocol name information and the storage path contained in the terminal registry, as shown in Table 2.

TABLE 2

| Protocol Name Information | Storage Path |
| --- | --- |
| qt: | Router1 |
| . . . | . . . |

For example, in Step 205 when it is determined that the voice client is not running, the terminal, according to the protocol name information "qt:" of the protocol used by the voice client, can obtain the storage path "Router1" of the voice client from the correspondence relationship between the protocol name information and the storage path contained in the terminal registry as shown table 2, and can start the voice client.

In Step 208, the terminal accesses the chat room to be accessed via the voice client, according to the room identification of the room to be accessed. The operation can then conclude.

For example, the terminal submits the room identification of the chat room to be accessed to the voice client. The voice client receives the room identification of the chat room to be accessed, logs into the voice server according to the stored user account and user password, and sends the request message used for accessing the chat room to the voice server. The request message contains the room identification of the chat room to be accessed and the user account. The voice server receives the request message, obtains the chat room to be accessed according to the room identification of the chat room to be accessed contained by the request message, adds the user account contained in the request message to the chat room to be accessed, sends the user account contained by the chat room to be accessed and the room-related information to the voice client; the voice client receives the user accounts contained by the chat room to be accessed and the room-related information, and creates the room-displaying interface, displays the user accounts contained by the chat room to be accessed and the room-related information on the room-displaying interface, so as to access the chat room to be accessed.

In addition, the voice client can obtain the user account and the user password from the shortcut of the chat room to be accessed, and after starting the voice client, submit the obtained user account and user password and the room identification of the chat room to be accessed to the voice client. The voice client can receive the user account and user password and the room identification of the chat room to be accessed, and log into the voice server according to the user account and the user password.

For example, the terminal can submit the room identification ID2 of the chat room 2 to the voice client. The voice client can receive the room identification ID2 of the chat room 2, send a request message used for accessing the chat room to the voice server, the request message containing the room identification ID2 of the chat room 2 and a user account. The voice server can receive the request message, obtain the chat room 2 according to the room identification ID2 of the chat room 2 contained by the request message, add the user account contained by the request message to the chat room 2, and send all of user accounts contained by the chat room 2 and the room-related information to the voice client. The voice client can receive all of the user accounts contained by the chat room 2 and the room-related information, create a room-displaying interface, and display all of the user accounts contained by the chat room 2 and the room-related information on the room-displaying interface to access the chat room 2.

As disclosed, the terminal receives the command used for creating the shortcut and submitted by the user, creates the shortcut of the chat room selected by the user, and displays the shortcut of the chat room on the terminal desktop. The user then selects a chat room that needs to be accessed, which is then as the chat room to be accessed. The terminal detects the shortcut of the chat room to be accessed. When that the user clicks on the shortcut of the chat room to be accessed is detected, the terminal obtains, from the shortcut of the chat room to be accessed, the room identification of the chat room to be accessed and protocol name information of the protocol used by a voice client; and accesses the chat room to be accessed according to the room identification of the chat room to be accessed and the protocol name information. Because the shortcut can be used for directly accessing the chat room, the user does not need to look for the chat room to be accessed from a number of chat rooms. Efficiency for accessing the chat room can then be improved.

FIG. 3 depicts an exemplary apparatus for accessing a chat room. The exemplary apparatus can include a detecting module 301, an obtaining module 302, and/or an accessing module 303.

The detecting module 301 is configured to detect a shortcut of a chat room to be accessed.

The obtaining module 302 is configured, when that a user clicks on the shortcut of the chat room to be accessed is detected, to obtain from the shortcut of the chat room to be accessed, a room identification of the chat room to be accessed and protocol name information of the protocol used by a voice client.

The accessing module 303 is configured to access the chat room to be accessed according to the room identification of the chat room to be accessed and the protocol name information.

The accessing module 303 includes a determining unit, and a first accessing unit. The determining unit is configured to determine whether the voice client is running according to the protocol name information. The first accessing unit is configured, when the voice client is running, to access the chat room to be accessed via the voice client, according to the room identification of the chat room to be accessed. The determining unit includes a first obtaining sub-unit, a deciding sub-unit, and a determining sub-unit.

The first obtaining sub-unit is configured to obtain the PID information of the process used for running the voice client from the correspondence relationship between the protocol name information and the PID information contained in the terminal registry, according to the protocol name information.

The deciding sub-unit is configured to decide whether the process used for running the voice client is running according to the obtained PID information.

The determining sub-unit is configured, when the process used for running the voice client is running, to determine that the voice client is running; or when the process used for running the voice client is not running, to determine that the voice client is not running.

In addition, the accessing module further includes a starting unit, and a second accessing unit. The starting unit is configured to start the voice client according to the protocol name information, when the voice client is not running. The second accessing unit is configured to access the chat room to be accessed via the voice client according to the room identification of the chat room to be accessed.

The starting unit includes a second obtaining sub-unit and a starting sub-unit. The second obtaining sub-unit is configured to obtain the storage path of the voice client from the correspondence relationship between the protocol name information and the storage path contained in the terminal registry, according to the protocol name information. The starting sub-unit is configured to start the voice client according to the storage path of the voice client.

In addition, the apparatus further includes a generating module. The generating module is configured to receive the command submitted by the user and used to create the shortcut; to obtain the protocol name information of the protocol used by the voice client, and the room identification and the icon of the chat room selected by the user; and to generate the shortcut of the chat room according to the protocol name information, and the room identification and the icon of the chat room.

The generating module includes a receiving unit and/or a creating unit. The receiving unit is configured to receive the command submitted by the user and used to create the shortcut; and to obtain the protocol name information of the protocol used by the voice client, and the room identification and the icon of the chat room selected by the user of the voice client.

The creating unit is configured to create the file having a file type of the shortcut type, to set the icon of the chat room as the icon of the file, to store the protocol name information and the room identification of the chat room in the file, and to obtain the shortcut of the chat room.

As disclosed, a shortcut of the chat room to be accessed can be detected. When that a user clicks on the shortcut of the chat room to be accessed is detected, a room identification of the chat room to be accessed and protocol name information of a protocol used by a voice client can be obtained from the shortcut of the chat room to be accessed. The chat room to be accessed can then be accessed according to the room identification of the chat room to be accessed and the protocol name information. Because the shortcut can be used for directly accessing the chat room, the user does not need to look for the chat room to be accessed from a number of chat rooms. Efficiency for accessing the chat room can then be improved.

Various embodiments further include a non-transitory computer-readable storage medium including instructions stored thereon. When being executed, the instructions cause the one or more processors of the disclosed apparatus (and/or terminal device) to perform the disclosed methods. Such apparatus (and/or terminal device) can thus include one or more processors, and a non-transitory computer-readable storage medium having instructions stored thereon, the instructions executed by the one or more processors and including the detecting module, the obtaining module, and the accessing module.

It should be noted that, in the present disclosure each embodiment is progressively described, i.e., each embodiment is described and focused on difference between embodiments. Similar and/or the same portions between various embodiments can be referred to with each other. In addition, exemplary apparatus is described with respect to corresponding methods.

Note that, the term "comprising", "including" or any other variants thereof are intended to cover a non-exclusive inclusion, such that the process, method, article, or apparatus containing a number of elements also include not only those elements, but also other elements that are not expressly listed; or further include inherent elements of the process, method, article or apparatus. Without further restrictions, the statement "includes a . . . " does not exclude other elements included in the process, method, article, or apparatus having those elements.

A person of ordinary skill in the art can understand that the modules included herein are described according to their functional logic, but are not limited to the above descriptions as long as the modules can implement corresponding functions. Further, the specific name of each functional module is used for distinguishing from on another without limiting the protection scope of the present disclosure.

In various embodiments, the disclosed modules can be configured in one apparatus or configured in multiple apparatus as desired. The modules disclosed herein can be integrated in one module or in multiple modules. Each of the modules disclosed herein can be divided into one or more sub-modules, which can be recombined in any manner.

One of ordinary skill in the art would appreciate that suitable software and/or hardware (e.g., a universal hardware platform) may be included and used in the disclosed methods and systems. For example, the disclosed embodiments can be implemented by hardware only, which alternatively can be implemented by software products only. The software products can be stored in a computer-readable storage medium (e.g., as shown in FIG. 14) including, e.g., ROM/RAM, magnetic disk, optical disk, etc. The software products can include suitable commands to enable a terminal device (e.g., including a mobile phone, a personal computer, or a network device, etc.) to implement the disclosed embodiments.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

Methods, apparatus for accessing a chat room are provided. A shortcut of the chat room to be accessed can be detected. When that a user clicks on the shortcut of the chat room to be accessed is detected, a room identification of the chat room to be accessed and protocol name information of a protocol used by a voice client can be obtained from the shortcut of the chat room to be accessed. The chat room to be accessed can then be accessed according to the room identification of the chat room to be accessed and the protocol name information.

Because the shortcut can be used for directly accessing the chat room, the user does not need to look for the chat room to be accessed from a number of chat rooms. Efficiency for accessing the chat room can then be improved.

What is claimed is:

1. A method for accessing a chat room comprising:
when a voice client is installed on a user terminal, storing, in a terminal registry of the user terminal, a correspondence relationship between a protocol name information of a protocol used by the voice client and a process identification (PID) information of a process for running the voice client;
receiving, by the voice client, a user selection of a menu item associated with a chat room shown in the voice client, wherein the menu item triggers a shortcut creation operation of the chat room;
in response to the user selection for the shortcut creation operation made in the voice client,
    creating a shortcut of the chat room as a shortcut-type file on a desktop interface of a user terminal;
    storing, in the shortcut-type file, the protocol name information of the protocol used by the voice client and a room identification of the chat room, wherein the protocol name information is used to identify the voice client installed on the user terminal, and to identify the PID information of the process for running the voice client;
    extracting an icon used by the chat room in the voice client; and
    using the extracted icon as an icon of the created shortcut-type file on the user terminal, wherein the icon is displayed on the desktop interface of the user terminal;
monitoring the shortcut of the chat room to be accessed;
when that a user clicks on the shortcut of the chat room to be accessed is detected, obtaining, from the shortcut of the chat room to be accessed, the room identification of the chat room to be accessed and the protocol name information of the protocol used by the voice client;
determining whether the voice client is running according to the protocol name information; and
when that the voice client is running is determined, accessing the chat room to be accessed according to the room identification of the chat room to be accessed and the protocol name information,
wherein determining whether the voice client is running according to the protocol name information comprises:
obtaining the PID information from the correspondence relationship between the protocol name information and the PID information stored in the terminal registry, according to the protocol name information;
deciding whether the process used for running the voice client is running according to the obtained PID information;
when the process used for running the voice client is running, determining that the voice client is running; and
when the process used for running the voice client is not running, creating a process, setting the obtained PID information as the PID information of the created process, and using the created process for running the voice client.

2. The method according to claim 1, further comprising:
when that the voice client is not running is determined, starting the voice client according to the protocol name information and accessing the chat room to be accessed via the voice client according to the room identification of the chat room to be accessed.

3. The method according to claim 2, wherein starting the voice client according to the protocol name information comprises:
obtaining a storage path of the voice client from a correspondence relationship between the protocol name information and the storage path contained in the client registry, according to the protocol name information; and
starting the voice client according to the storage path of the voice client.

4. The method according to claim 1, wherein, before detecting the shortcut of the chat room to be accessed, the method further comprises:
receiving, by the voice client, a command submitted by the user and used to create the shortcut corresponding to the chatroom selected by the user;
obtaining the protocol name information of the protocol used by the voice client, and the room identification and the icon of the chat room; and
generating the shortcut of the chat room according to the protocol name information, and the room identification and the icon of the chat room.

5. A non-transitory computer-readable storage medium comprising instructions stored thereon, wherein, when being executed, the instructions cause the one or more processors of an apparatus to perform the method according to claim 1.

6. An apparatus for accessing a chat room comprising:
a memory; and
one or more processors coupled to the memory, the one or more processors being configured to:
when a voice client is installed on a user terminal, store, in a terminal registry of the user terminal, a correspondence relationship between a protocol name information of a protocol used by the voice client and a process identification (PID) information of a process for running the voice client;
receive, by the voice client, a user selection of a menu item associated with a chat room shown in the voice client, wherein the menu item triggers a shortcut creation operation of the chat room;
in response to the user selection for the shortcut creation operation made in the voice client,
create a shortcut of the chat room as a shortcut-type file on a desktop interface of a user terminal;
store, in the shortcut-type file, the protocol name information of the protocol used by the voice client and a room identification of the chat room, wherein the protocol name information is used to identify the voice client installed on the user terminal, and to identify the PID information of the process for running the voice client;
extract an icon used by the chat room in the voice client; and
use the extracted icon as an icon of the created shortcut-type file on the user terminal, wherein the icon is displayed on the desktop interface of the user terminal;
monitor the shortcut of the chat room to be accessed;
when that a user clicks on the shortcut of the chat room to be accessed is detected, obtain, from the shortcut of the chat room to be accessed, the room identification of the chat room to be accessed and the protocol name information of the protocol used by the voice client;
determine whether the voice client is running according to the protocol name information; and
when that the voice client is running is determined, access the chat room to be accessed according to the room identification of the chat room to be accessed and the protocol name information,
wherein determining whether the voice client is running according to the protocol name information comprises:
obtaining the PID information from the correspondence relationship between the protocol name information and the PID information stored in the terminal registry, according to the protocol name information;
deciding whether the process used for running the voice client is running according to the obtained PID information;
when the process used for running the voice client is running, determining that the voice client is running; and
when the process used for running the voice client is not running, creating a process, setting the obtained PID information as the PID information of the created process, and using the created process for running the voice client.

7. The apparatus according to claim 6, wherein the one or more processors is further configured to:
start the voice client according to the protocol name information, when the voice client is not running; and
access the chat room to be accessed via the voice client according to the room identification of the chat room to be accessed.

8. The apparatus according to claim 7, wherein the one or more processors is further configured to:
obtain a storage path of the voice client from a correspondence relationship between the protocol name information and the storage path contained in the client registry, according to the protocol name information; and
start the voice client according to the storage path of the voice client.

9. The apparatus according to claim 6, wherein the one or more processors is further configured: to receive, from the voice client, a command submitted by the user and used to create the shortcut corresponding to the chatroom selected by the user; to obtain the protocol name information of the protocol used by the voice client, and the room identification and the icon of the chat room; and to generate the shortcut of the chat room according to the protocol name information, and the room identification and the icon of the chat room.

10. The method according to claim 1, further comprising:
during an installation process of the voice client on the user terminal, storing, in a client registry of the user terminal, a correspondence relationship between the protocol name information and a process identification (PID) information, and a correspondence relationship between the protocol name information and a local storage path for locating the voice client in the user terminal,
wherein the PID information is used as an identification name of a process created by the user terminal to run the voice client when the voice client is started in the user terminal.

11. The method according to claim 10, wherein:
the PID information is defined when the voice client is developed.

12. The method according to claim 1, wherein:
the protocol name information is used by the user terminal to identify, among multiple applications installed on the user terminal, the voice client; and
the protocol name information is further used by the voice client for communication between the voice client and a voice server.

13. The method according to claim 1, further comprising:
when creating the shortcut of the chat room, obtaining a user account and a user password for logging into a voice server corresponding to the voice client; and storing the user account and the user password in the shortcut-type file.

* * * * *